(12) United States Patent
Boivie

(10) Patent No.: US 7,860,920 B2
(45) Date of Patent: *Dec. 28, 2010

(54) MULTICAST ENABLED WEB-BASED APPLICATION DATA DISTRIBUTION

(75) Inventor: Richard H. Boivie, Monroe, CT (US)

(73) Assignee: International Business Machines Corporation, Armonk, NY (US)

(*) Notice: Subject to any disclaimer, the term of this patent is extended or adjusted under 35 U.S.C. 154(b) by 531 days.

This patent is subject to a terminal disclaimer.

(21) Appl. No.: 11/928,404

(22) Filed: Oct. 30, 2007

(65) Prior Publication Data

US 2009/0135819 A1    May 28, 2009

Related U.S. Application Data

(63) Continuation of application No. 09/696,566, filed on Oct. 25, 2000, now abandoned.

(51) Int. Cl.
*G06F 15/16* (2006.01)
(52) U.S. Cl. .................. 709/201; 709/238; 709/239
(58) Field of Classification Search ............. 709/201, 709/203, 238–239
See application file for complete search history.

(56) References Cited

U.S. PATENT DOCUMENTS

| | | | |
|---|---|---|---|
| 5,541,927 A | 7/1996 | Kristol et al. | |
| 5,757,669 A | 5/1998 | Christie et al. | |
| 5,862,329 A | 1/1999 | Aras et al. | |
| 6,018,766 A | 1/2000 | Samuel et al. | |
| 6,154,463 A | 11/2000 | Aggarwal et al. | |
| 6,182,117 B1 | 1/2001 | Christie et al. | |
| 6,269,085 B1 | 7/2001 | Provino et al. | |
| 6,321,270 B1 | 11/2001 | Crawley | |
| 6,331,983 B1 | 12/2001 | Haggerty et al. | |
| 6,502,140 B1 * | 12/2002 | Boivie ....................... | 709/238 |
| 6,577,599 B1 | 6/2003 | Gupta et al. | |
| 6,578,088 B2 | 6/2003 | Ohno et al. | |
| 6,587,943 B1 | 7/2003 | Hardjono | |
| 6,625,773 B1 | 9/2003 | Boivie et al. | |
| 6,757,294 B1 * | 6/2004 | Maruyama ................. | 370/432 |
| 6,785,275 B1 * | 8/2004 | Boivie et al. ............... | 370/390 |
| 6,862,279 B1 | 3/2005 | Imai et al. | |
| 6,880,090 B1 * | 4/2005 | Shawcross ................. | 709/245 |
| 6,917,983 B1 * | 7/2005 | Li ............................. | 709/238 |
| 7,016,351 B1 * | 3/2006 | Farinacci et al. .......... | 370/392 |

OTHER PUBLICATIONS

Boivie et al, "Small Group Multicast: A New Solution for Multicasting on the Internet", IEEE, p. 75, p. 79, May-Jun. 2000.
Klinker, "Multicast Tree Construction in Directed Networks", IEEE 1996.
Braun, "Multicast for Small Conferences", IAM-00-008, Jul. 2000.
H-Peter Dommel et al, "Ordered end to end multicast for distributed multimedia system", System Sciences, proceeding of 33rd Hawaiii Internet Conference, Jan. 2000.

* cited by examiner

*Primary Examiner*—Philip B Tran
(74) *Attorney, Agent, or Firm*—Jose Gutman; Fleit Gibbons Gutman Bongini & Bianco PL

(57) ABSTRACT

A method, information processing unit, and computer readable storage medium, are provided for distributing data packets efficiently across a packet-based data network of information processing units and intermediate nodes. The method with an information processing unit includes receiving data and identification of destinations on a packet-based data network, the data being associated with the identification of, and destined for reception by, each of the destinations on the packet-based data network. The method sends a single copy of the data across the packet-based data network via intermediate nodes to the destinations using a reliable multicast technique, the single copy of the data being sent contained in one or more multi-cast data packets. Each multi-cast data packet includes a multi-cast indicator and one or more unicast addresses associated with one or more of the destinations on the packet-based data network.

14 Claims, 7 Drawing Sheets

MULTICAST ENABLED WEB-BASED APPLICATION DATA DISTRIBUTION

CROSS-REFERENCE TO RELATED APPLICATIONS

This application is a continuation of U.S. patent application Ser. No. 09/696,566, entitled "Multicast Enabled Mail" filed on Oct. 25, 2000, now abandoned, which is assigned to the same assignee as this application and the teachings of which are hereby incorporated by reference.

This application is related to U.S. patent application Ser. No. 09/240,546, entitled "Reliable Multicast For Small Groups" filed on Jan. 29, 1999, now U.S. Pat. No. 6,415,312, and is related to U.S. patent application Ser. No. 09/240,549, entitled "Multicast Support For Small Groups", filed on Jan. 29, 1999, now U.S. Pat. No. 6,502,140, and is related to U.S. patent application Ser. No. 09/329,101, entitled "System For Multicast Communications In Packet Switched Networks" filed on Jun. 9, 1999, now U.S. Pat. No. 6,625,773, and is related to U.S. patent application Ser. No. 09/696,116, entitled "Multicast Enabled Web Content Distribution" filed on Oct. 25, 2000, now U.S. Pat. No. 7,254,602, which are all assigned to the same assignee as this application and the collective teachings of which are hereby incorporated by reference.

BACKGROUND OF THE INVENTION

1. Field of the Invention

The invention generally relates to web-based application data distribution systems, and more particularly it relates to an improved method and system for distribution of web-based application data.

2. The Prior Art

Web-based communication systems have used unicast to distribute data to users on a packet-based data network such as the Internet or an IP-based enterprise network. Unicast means that a unique copy of a data message is sent to each of the destination machines.

As an example, FIG. 1 illustrates a prior art system of electronic mail distribution (100) showing the replication of mail messages in an electronic mail transmission. The electronic mail distribution system as shown in FIG. 1 comprises a plurality of client machines (102, 110a to 110x) which may be personal computers, dumb terminals, workstations, PDA's, cell phones, other terminal devices, or the equivalent. Also, the prior art electronic mail distribution system of FIG. 1 further comprises a plurality of mail servers (104, 108a to 108n) and a plurality of routers (106a to 106f).

An electronic mail message (112a . . . z) is composed on a client computer (102) with a plurality of recipients (a . . . z) that have mailboxes on machines (108a to 108n). At the client's mail server (104), the message (112a . . . z) is replicated into a plurality of messages (112a . . . z) and one copy of the message is sent to each of the destinations. Alternatively, the client computer (102) itself may replicate the message and send a copy to each of the destinations. In the Internet or in a TCP/IP based enterprise network, these copies might be sent using the well-known TCP/IP protocols.

FIG. 2 illustrates a prior art functional sequence (200) of an electronic mail distribution system. First, a mail message (112a . . . z) is created (202) at a client machine (102). Then a mail message (112a . . . z) is duplicated (204), either at a client machine (102) or at a mail server (104), for each destination (110a to 110x). Then one copy of the mail message (112a . . . z) is sent (206) to each destination mailbox on mail servers (108a to 108n).

This type of electronic mail distribution uses a significant amount of bandwidth in the Internet and in enterprise networks. Since messages are expected to increase in size as audio, image and video data incorporated into electronic data messages become more common, electronic data messages will consume even more bandwidth. This increase in the amount of bandwidth that electronic data messages will consume means that either there will be less bandwidth available for other applications such as web-based applications or that more network bandwidth will be required which can be expensive. Thus, there is a need for an improved method and system for efficiently delivering electronic data messages that consumes less network bandwidth.

SUMMARY OF THE INVENTION

A method, information processing unit, and computer readable storage medium, are provided for distributing data packets efficiently across a packet-based data network of information processing units and intermediate nodes. The method with an information processing unit includes receiving data and identification of destinations on a packet-based data network, the data being associated with the identification of, and destined for reception by, each of the destinations on the packet-based data network. The method sends a single copy of the data across the packet-based data network via intermediate nodes to the destinations using a reliable multicast technique, the single copy of the data being sent contained in one or more multi-cast data packets. Each multi-cast data packet includes a multi-cast indicator and one or more unicast addresses associated with one or more of the destinations on the packet-based data network.

Various embodiments of the invention also include the use of intermediate nodes that receive and forward multicast packets appropriately, i.e., in the direction of the various destinations. The forwarding of these multicast packets is accomplished, for example, as described in application Ser. No. 09/329,101, filed on Jun. 9, 1999, or via another reliable multicast mechanism.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
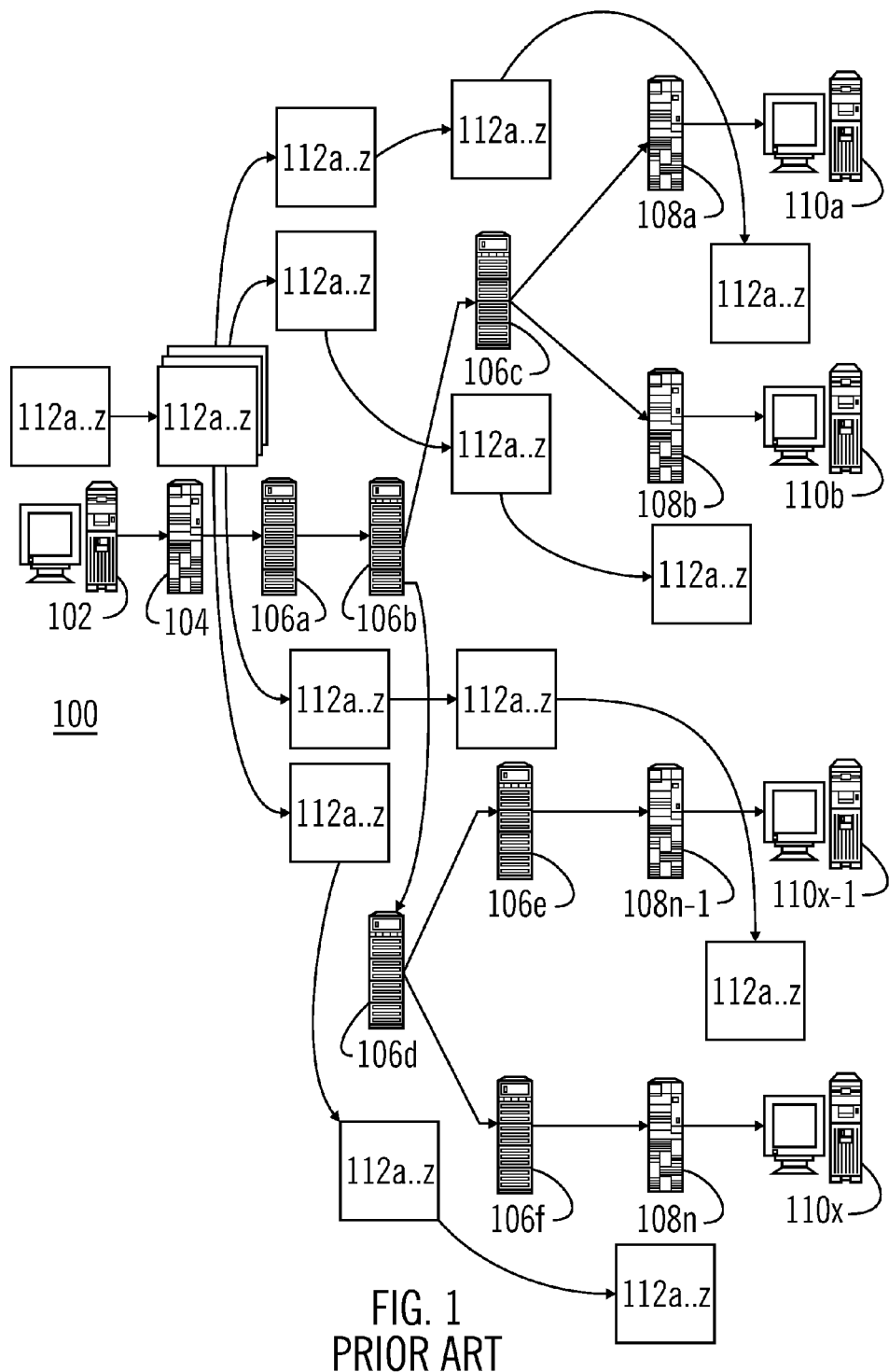
FIG. 1 illustrates a prior art system of electronic mail distribution showing the replication of mail messages in an electronic mail transmission.
Figure 2:
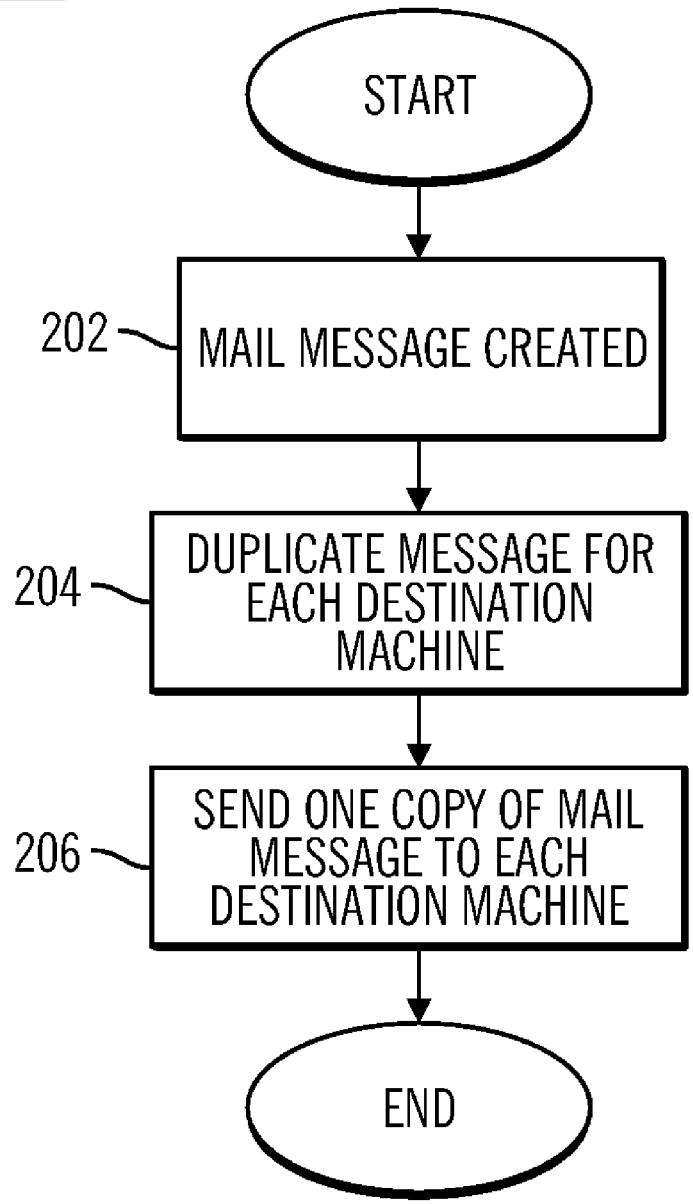
FIG. 2 illustrates a prior art functional sequence of an electronic mail distribution system.

It is important to note that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

In the drawing like numerals refer to like parts through several views.

Exemplary Embodiment Multicast Enabled Mail

Figure 3:
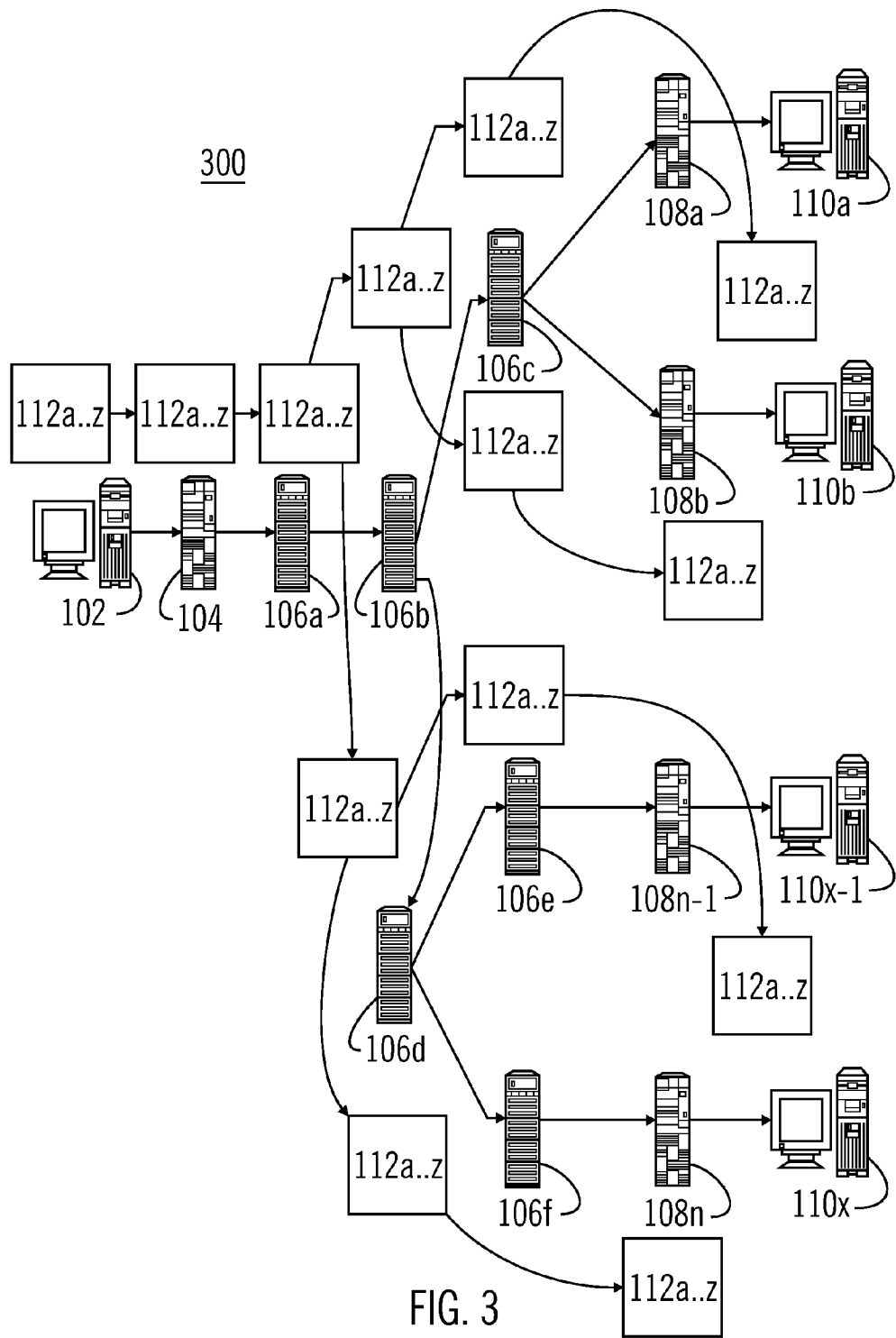
FIG. 3 illustrates an electronic mail distribution system according to a preferred embodiment of the present invention.

FIG. 3 illustrates an exemplary electronic mail distribution system (300) according to a preferred embodiment of the present invention. The electronic mail distribution system (300) as shown in FIG. 3 comprises a plurality of client machines (102, 110a to 110x) comprising personal computers, DOS machines, WINDOWS machines, Macintosh machines, Linux machines, dumb terminals, cellular telephones, PDA's, and other terminal devices. Client machines (102, 110a to 110x) may also be referred to herein as client computers or as information processing units. An information processing unit (102, 110a to 110x), according to a preferred embodiment of the present invention, comprises a reception unit for receiving a mail message and a transmission unit for transmitting the message into a network. A reception unit, according to one preferred embodiment of an information processing unit, may comprise a user interface for receiving a mail message composed by a user. Alternatively, the reception unit may comprise other types of interfaces for receiving and for storing a message, or message packets, destined for transmission as a mail message, or as message packets, in the electronic mail distribution system. The transmission unit may comprise, according to a preferred embodiment of the present invention, at least one of a modem, a network interface, a transceiver, a wireless transceiver, and other interfacing hardware and software. Also, the improved electronic mail distribution system of FIG. 3 further comprises a plurality of mail servers (104, 108a to 108n) and a plurality of routers (106a to 106f). Mail servers (104, 108a to 108n) and routers (106a to 106f) may also be referred to herein as intermediate nodes of the electronic mail distribution system (300). An intermediate node, according to a preferred embodiment of the present invention, comprises a reception unit that includes a network interface for receiving and for storing a message, or message packets, destined for transmission as a mail message, or as message packets, in the electronic mail distribution system. The intermediate node typically includes a processor operating according to software programs and memory coupled to the processor for storing information accessible by the processor. The processor utilizes software programs in the memory for determining whether to forward a received message to other nodes in the network. The processor receives message information, such as message packets, and stores this message information in the memory. After determining a "next hop" for a message, the processor forwards copy of the message information, e.g., message packets, to another node in the network. Additionally, according to an alternative preferred embodiment, the processor acknowledges ACK and/or NAK signals and retransmits message packets as may be necessary to forward a message, e.g., message packets, to another node in the network. Also, for reception of message information, e.g., message packets, the processor utilizes ACK and/or NAK signals to communicate with another node in the network, such as to coordinate retransmission of message packets in the network.

Figure 4A:
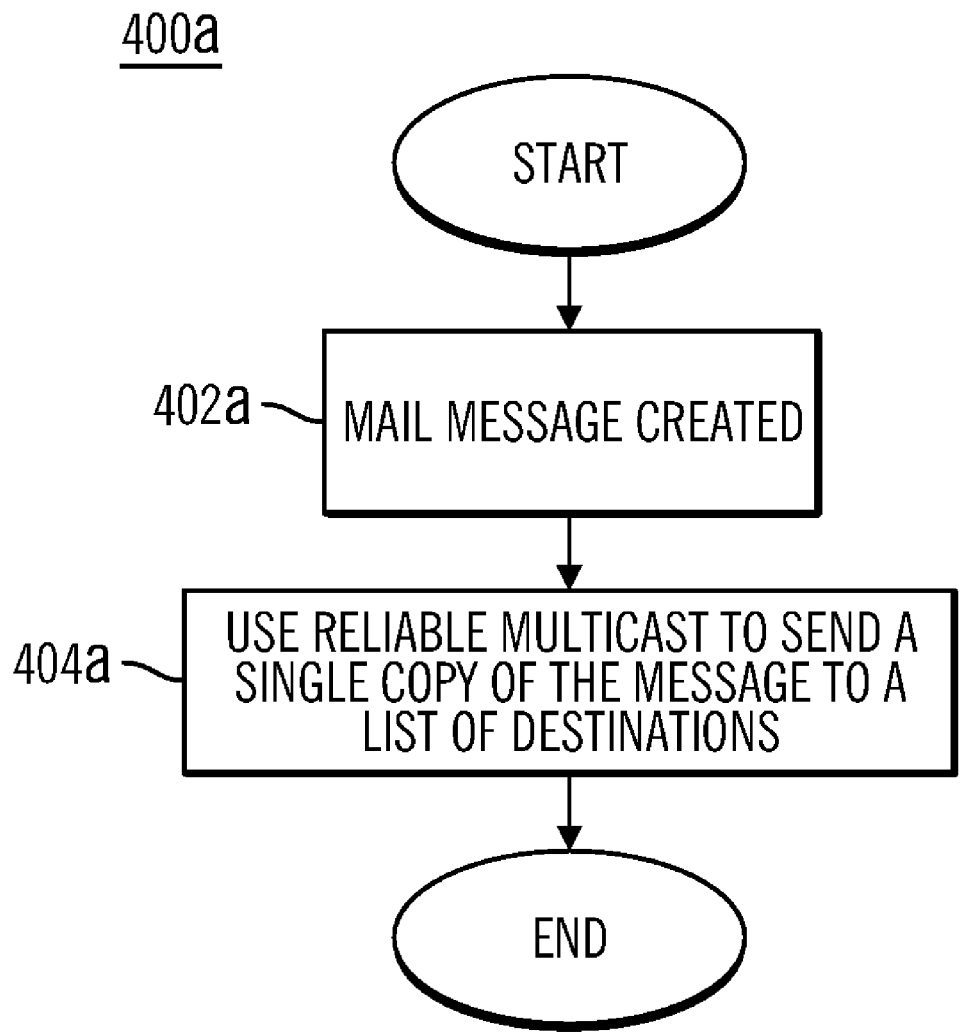
FIG. 4a illustrates an exemplary functional sequence of an electronic mail application program in accordance with a preferred embodiment of the present invention.
Figure 4B:
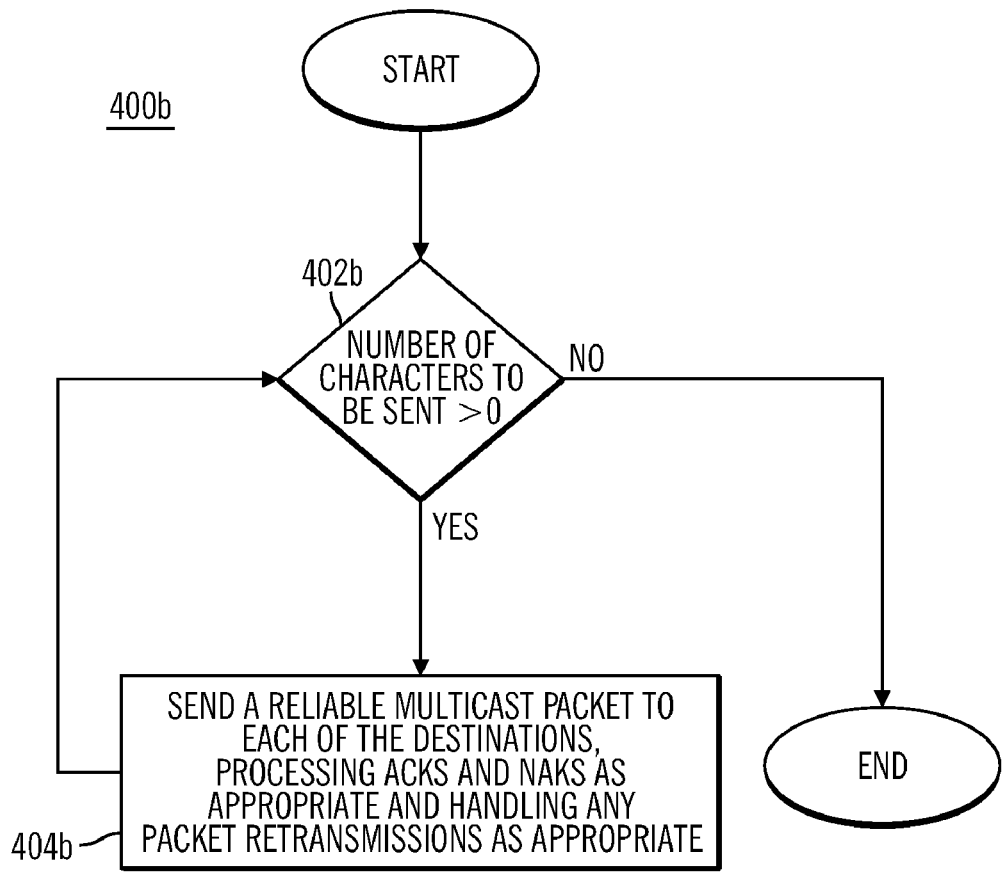
FIG. 4b illustrates an exemplary functional sequence of a reliable multicast software according to a preferred embodiment of the present invention.
Figure 4C:
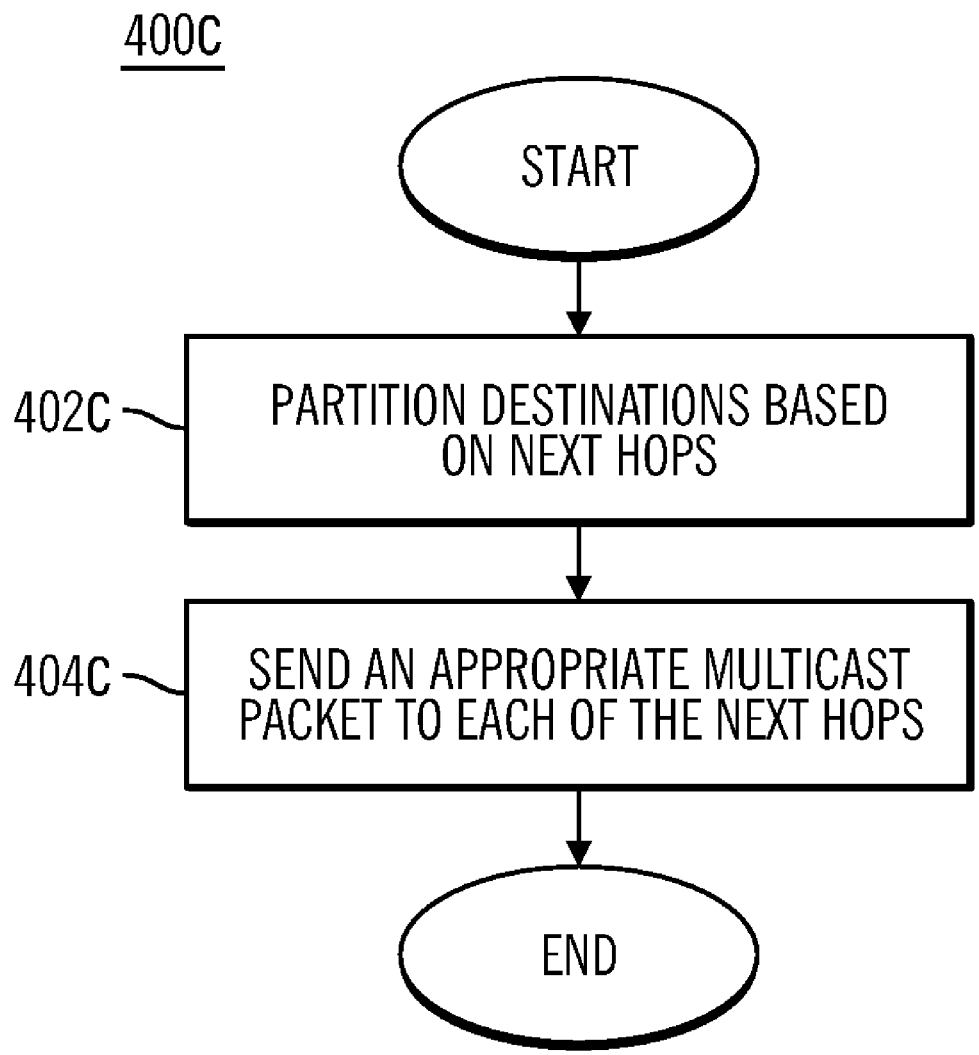
FIG. 4c illustrates an exemplary functional sequence of a reliable multicast software as practiced on intermediate nodes in accordance with a preferred embodiment of the present invention.

An electronic mail message (112a . . . z) is composed on a client computer (102), the mail message (112a . . . z) destined for reception by a plurality of recipients (a . . . z) that correspond to mailboxes on destination mail servers (108a to 108n). Typically, the mail message (112a . . . z) is transmitted from the client computer to a mail server (104) which is responsible for delivering the mail message (112a . . . z) to the destination mail servers (108a to 108n). Typically, the mail message (112a . . . z) is transmitted from the client computer (102) to the mail server (104) in one or more packets using the well-known TCP/IP protocols. In one embodiment of this invention, the mail server (104) transmits the mail message (112a . . . z) to the destination mail servers (108a to 108n) using a reliable multicast protocol such as the Reliable Small Group Multicast (Reliable SGM) protocol such as described in application Ser. No. 09/329,101, filed on Jun. 9, 1999. In another exemplary embodiment of the present invention, the client computer (102) uses a reliable multicast protocol such as the Reliable SGM to transmit the message to the destination mail servers (108a to 108n). In either exemplary case, the source of the multicast packets (which in the examples can be the client machine (102) or the mail server (104)) sends a single stream of packets which are replicated at intermediate nodes acting as multicast routers so that an appropriate stream of packets reaches each of the destination mail servers (108a to 108n). For example, in FIG. 3, intermediate node 106c receives one or more packets from 106a and forwards copies of the packet or packets on to mail servers (108a and 108b). The intermediate nodes that are acting as multicast routers may use the Reliable SGM, such as described in application Ser. No. 09/329,101, or another multicast mechanism. The intermediate nodes that are operating as multicast routers, according to an alternative preferred embodiment of the present invention, could be IP routers, mail servers or other nodes that have been augmented with appropriate multicast function. Since normally one copy of the mail message (e.g., one copy of any part of the mail message) traverses any link in the network, the mail distribution system shown in FIG. 3 will be more efficient in terms of network bandwidth than existing mail distribution systems, such as shown in FIG. 1. FIGS. 4a, 4b and 4c, illustrate a preferred process for electronic mail message distribution in a reliable multicast system, according to a preferred embodiment of the present invention.

Mail Application Program Functionality

FIG. 4a illustrates an operational sequence (400a) of an electronic mail application program according to a preferred embodiment of the present invention. First, a mail message (112a . . . z) is created (402a) and then the mail message (112a . . . z) is distributed (404a) using a reliable multicast mechanism. As discussed above, the reliable multicast mechanism, according to a preferred embodiment of the present invention, utilizes the Reliable SGM mechanism such as described in application Ser. No. 09/329,101, or via another mechanism for reliable multicast. Also, as discussed above, the source of the multicast transmission preferably can be a client computer (102) or a mail server (104).

Reliable Multicast Software Functionality

FIG. 4b illustrates a functional sequence (400b) of a reliable multicast software package according to a preferred embodiment of the present invention. First, a determination is made as whether there is more message to transmit, such as whether there are more characters (i.e., there is more message) to be transmitted (402b). If there are no more characters (i.e., no more message) to be transmitted then the process ends. However, if there are more characters (i.e., more message) to be transmitted then the process sends a multicast packet to the destinations (404b). The reliable multicast software might also, in certain alternative embodiments, process acknowledgment packets or ACKs and/or negative acknowledgments or NAKs and perform re-transmissions as described in application Ser. No. 09/329,101. In other embodiments the ACKs and/or NAKSs and retransmissions might be handled by intermediate nodes such as routers. As mentioned above a variety of different reliable multicast schemes are possible. Error detection and correction protocols may also be used as is well known in the art. For specific implementations, the particular choice of a reliable multicast mechanism and the particular choices for error detection and correction protocols should be obvious to one of ordinary skill in the art in view of the discussion above.

Intermediate Node Multicast Functionality

FIG. 4c illustrates a functional sequence (400c) of a multicast software that is operational on intermediate nodes utilizing the reliable SGM mechanism according to a preferred embodiment of the present invention. First, when a packet is received, for example, the destinations associated with the packet are partitioned (402c) based on the next node that the packet should be sent to for delivering to each of the destinations. This next node is also known as a "next hop" that the packet should be forwarded to for delivering to each destination. According to a preferred embodiment, a "next hop" comprises a node, which can be an intermediate node or a destination node, to which a packet should be transmitted in a multicast transmission. Then, an appropriate multicast packet is sent (404c) to each of these "next hops", preferably as described in application Ser. No. 09/329,101. As mentioned above, other mechanisms for implementing a reliable multicast can also be used. Also, as mentioned above, the intermediate node multicast routing capability can be implemented on IP routers, mail servers or other nodes.

Mail Message

Figure 5:
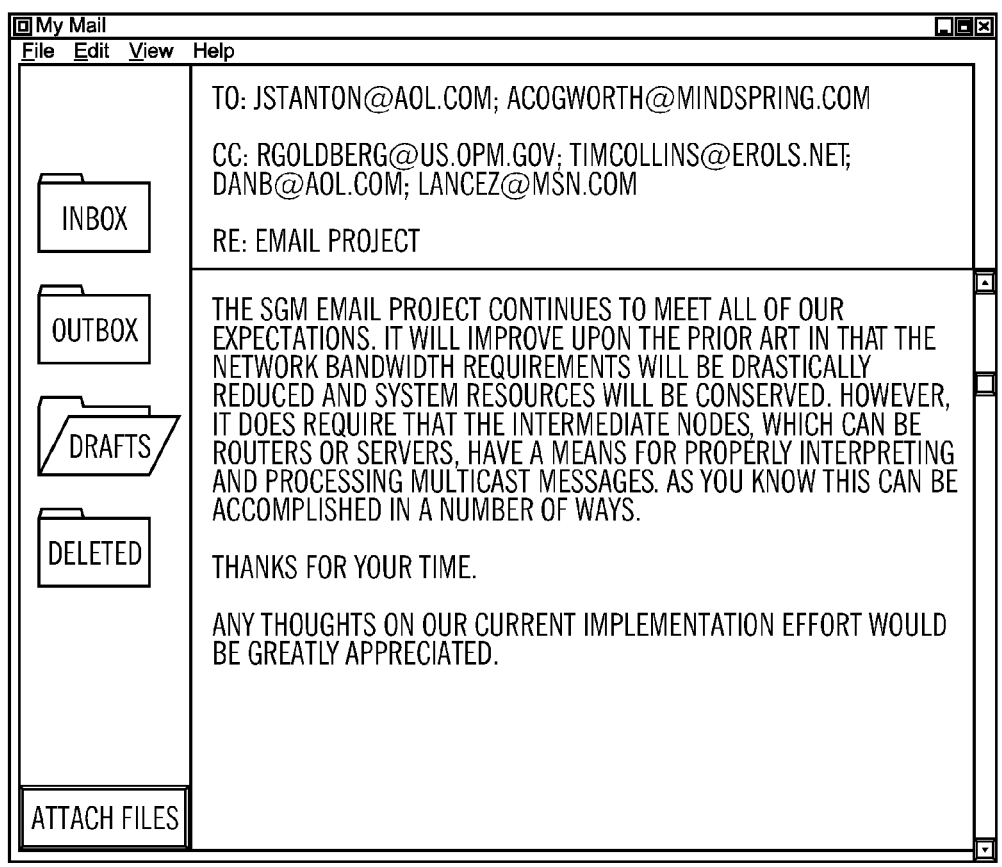
FIG. 5 illustrates an exemplary mail message for distribution in an electronic mail distribution system in accordance with a preferred embodiment of the present invention.

FIG. 5 illustrates a mail message (500) that utilizes an electronic mail distribution system as shown in FIG. 3. The mail message (500) of FIG. 5 contains two main mail recipients and four carbon copy recipients for a total of six recipients. The mailboxes for these six recipients might reside on five mail servers. A reliable multicast will be used to send copies of this mail message to each of the five mail servers. As stated above, the source of the multicast can be a client computer or a mail server. If the reliable SGM mechanism is used as described in application Ser. No. 09/329,101, the destination addresses that appear in the SGM packet are the addresses of the mail servers where the recipients have their mailboxes and these addresses would be used to route packets through the routers or intermediate nodes as described in application Ser. No. 09/329,101. Of course, it's also possible to use other mechanisms for reliable multicast as discussed above.

CONCLUSION

Multicast-enabled mail uses a reliable multicast scheme, such as Reliable Small Group Multicast or other reliable multicast scheme in a mail distribution system to improve efficiencies in the distribution of electronic mail. Multicast-enabled mail can be used to reduce the cost of network bandwidth in the Internet or in an enterprise network or to increase the usefulness of the existing bandwidth in a given network by making it possible to support more users or more applications in a given amount of network bandwidth.

Discussion of Hardware and Software Implementation Options

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

Although specific embodiments of the invention have been disclosed, those having ordinary skill in the art understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for distributing data packets efficiently across a packet-based data network of information processing units and intermediate nodes, the method with an information processing unit comprising the steps of:

receiving data and identification of a plurality of destinations on a packet-based data network, the data being associated with the identification of, and destined for reception by, each of the plurality of destinations on the packet-based data network; and sending a single copy of the data across the packet-based data network via intermediate nodes to the plurality of destinations using a reliable multicast technique, the single copy of the data being sent contained in one or more multi-cast data packets, and wherein each multi-cast data packet comprising a multi-cast indicator and one or more unicast addresses associated with one or more destinations of the plurality of destinations on the packet-based data network.

2. The method as defined in claim 1, wherein the reliable multicast technique comprises a reliable small group multi-cast technique.

3. The method as defined in claim 1, wherein the single copy of the data is contained in a data payload portion of the one or more multi-cast data packets, and wherein the multi-cast indicator and one or more unicast addresses are contained in a header portion of the one or more multi-cast data packets.

4. The method as defined in claim 1, wherein the packet-based data network comprises the world wide web and the Internet, and wherein the data contained in the data payload portion of the one or more multi-cast data packets comprises web-based application data.

5. An information processing unit for distributing web-based application data efficiently across a packet-based data network of information processing units and intermediate nodes, the information processing unit comprising:

a reception unit for receiving web-based application data and identification of a plurality of destinations on a packet-based data network, the web-based application data being associated with the identification of, and destined for reception by, each of the plurality of destinations on the packet-based data network; and a transmission unit for transmitting a single copy of the web-based application data across the packet-based data network via intermediate nodes to the plurality of destinations using a reliable multicast technique, the single copy of the web-based application data being sent contained in one or more multi-cast data packets, and wherein each multi-cast data packet comprising a multi-cast indicator and one or more unicast addresses associated with one or more destinations of the plurality of destinations on the packet-based data network.

6. The information processing unit as defined in claim 5, wherein the reliable multicast technique comprises a reliable small group multicast technique.

7. The information processing unit as defined in claim 5, wherein the single copy of the data is contained in a data payload portion of the one or more multi-cast data packets, and wherein the multi-cast indicator and one or more unicast addresses are contained in a header portion of the one or more multi-cast data packets.

8. The information processing unit as defined in claim 5, wherein the packet-based data network comprises the world wide web and the Internet, and wherein the data contained in the data payload portion of the one or more multi-cast data packets comprises web-based application data.

9. The information processing unit as defined in claim 5, wherein the transmission unit operates according to a reliable multicast technique and communication protocol to process ACKs and NAKs as well as packet retransmissions.

10. A non-transitory computer readable storage medium including instructions for distributing data packets efficiently across a packet-based data network of information processing units and intermediate nodes, comprising instructions for:

receiving data and identification of a plurality of destinations on a packet-based data network, the data being associated with the identification of, and destined for reception by, each of the plurality of destinations on the packet-based data network; and sending a single copy of the data across the packet-based data network via intermediate nodes to the plurality of destinations using a reliable multicast technique, the single copy of the data being sent contained in one or more multi-cast data packets, and wherein each multi-cast data packet comprising a multi-cast indicator and one or more unicast addresses associated with one or more destinations of the plurality of destinations on the packet-based data network.

11. The non-transitory computer readable storage medium as defined in claim 10, wherein the reliable multicast technique comprises a reliable small group multicast technique.

12. The non-transitory computer readable storage medium as defined in claim 10, wherein the single copy of the data is contained in a data payload portion of the one or more multi-cast data packets, and wherein the multi-cast indicator and one or more unicast addresses are contained in a header portion of the one or more multi-cast data packets.

13. The non-transitory computer readable storage medium as defined in claim 10, wherein the sending a single copy of the data sends the data contained in one or more multi-cast data packets according to a reliable multicast technique and communication protocol to process ACKs and NAKs as well as packet retransmissions.

14. The non-transitory computer readable storage medium as defined in claim 10, wherein the packet-based data network comprises the world wide web and the Internet, and wherein the data contained in the data payload portion of the one or more multi-cast data packets comprises web-based application data.

* * * * *